March 8, 1955 R. C. SANDERLIN ET AL Re. 23,961

OPERATING HANDLE

Original Filed July 18, 1949 2 Sheets-Sheet 1

Ralph C. Sanderlin
Fred M. Grant
INVENTOR.

BY Ahley & Ahley

March 8, 1955 R. C. SANDERLIN ET AL Re. 23,961

OPERATING HANDLE

Original Filed July 18, 1949 2 Sheets-Sheet 2

Ralph C. Sanderlin
Fred M. Grant
INVENTOR.

BY Ashley & Ashley

United States Patent Office

Re. 23,961
Reissued Mar. 8, 1955

23,961

OPERATING HANDLE

Ralph C. Sanderlin, Seattle, Wash., and Fred M. Grant, Grand Prairie, Tex., assignors to Jesse Earl Bush, Dallas, Tex.

Original No. 2,605,648, dated August 5, 1952, Serial No. 105,384, July 18, 1949. Application for reissue August 2, 1954, Serial No. 448,792

8 Claims. (Cl. 74—528)

Matter enclosed in heavy brackets [ ] appears in the original patent but forms no part of this reissue specification; matter printed in italics indicates the additions made by reissue.

This invention relates to new and useful improvements in operating handles and more particularly to handles for operating and locking jalousies in adjusted positions.

One object of the invention is to provide an improved handle for operating a jalousie or external Venetian blind which is so constructed that the same may be locked in any position to prevent operation of the jalousie.

Another object of the invention is to provide an improved operating handle having coacting wedge surfaces adapted to be tightly engaged for locking the handle against operation.

Still another object of the invention is to provide an improved operating handle having a rotatable lever and cam means actuated by the lever for moving conical surfaces into tight engagement so as to lock said lever against rotation.

A further object of the invention is to provide an improved operating handle, of the character described, having a cam ring rotatable with its lever and movable transversely thereof, the lever being pivoted in the plane of movement of the cam ring whereby said ring undergoes transverse movement relative to said lever so as to facilitate locking and unlocking of the handle.

A construction designed to carry out the invention will be hereinafter described together with other features of the invention.

The invention will be more readily understood from a reading of the following specification and by reference to the accompanying drawings, wherein examples of the invention are shown, and wherein.

Figure 3:
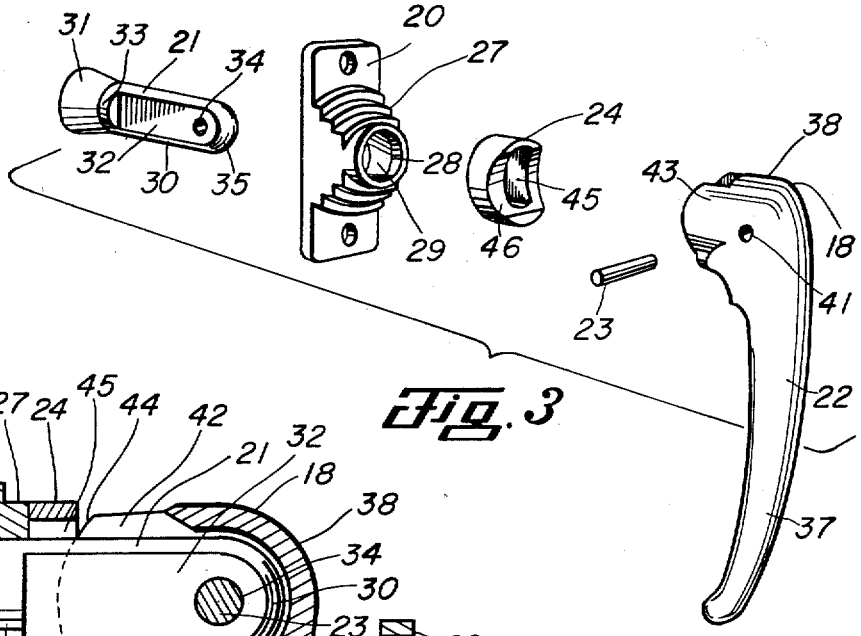
Fig. 3 is an exploded perspective view of the handle.

In the drawings, the numeral 10 designates a portion of an external Venetian blind or jalousie mounted upon the frame or jamb 11 of a window or other opening. The jalousie, which forms no part of the present invention, includes, a plurality of transverse louvers 12 having lateral wings or flanges 13 at their ends pivotally connected to a frame 14 and adapted to be tilted by a flat actuating rod or bar 15. A pair of links 16 and 17 are pivotally attached to the bar 15 for connecting an operating handle 18 thereto whereby rotation of the handle causes tilting of the louvers 12. A shaft 19, preferably polygonal in cross-section, extends through the jamb 11 and connects the handle 18 to the link 17. The handle includes a base or escutcheon plate 20, an element or spindle 21 rotatably mounted in the plate, an actuating lever 22 pivotally connected by a pin 23 to the spindle, and a cam member or ring 24 confined upon said spindle between the lever and plate (Fig. 3).

The plate 20 is substantially flat and rectangular and has openings 25 in its ends so as to be connected to the jamb 11 by suitable screws 26. A transverse boss 27, which may be stepped externally, is made integral with the intermediate portion of the plate and a cylindrical opening or bore 28 extends through said plate and its boss. The inner or major portion of the bore 28 is tapered or flared outwardly toward the underside of the plate so as to provide a conical counterbore or wedge surface 29.

Figure 5:
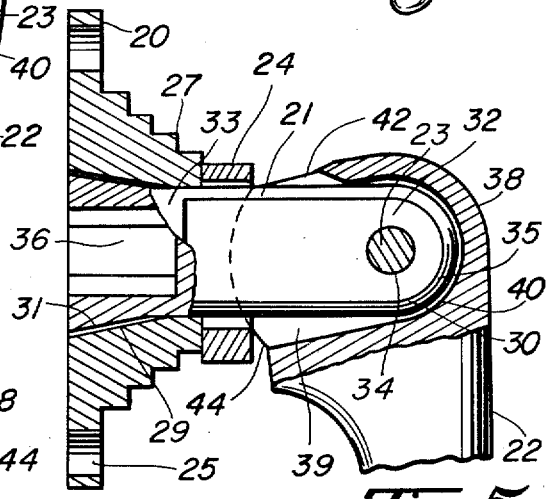

The spindle 21 includes a substantially cylindrical body 30 of a length greater than the length of the bore 28 so as to project beyond the boss 27 when engaged in said bore. A conical shank or wedge surface 31, complementary to the conical surface 29, is formed on the inner end portion of the spindle for coacting with said conical surface to lock or wedge said spindle against rotation. Due to the conical surfaces, outward movement or displacement of the spindle is limited. As shown by the numeral 32, the major portion of the spindle is flattened on opposite sides so as to be substantially rectangular or oval in cross-section. Between the conical and flattened surfaces 31 and 32, a circular portion 33 is provided for coacting with the cylindrical bore 28 in maintaining the spindle in axial alinement with said bore. A transverse opening 34 is formed in the outer end of the spindle to receive the pin 23 which connects the lever 22 to said spindle and said outer end is preferably rounded as shown by the numeral 35. The conical shank of the spindle has a polygonal socket 36 formed therein for receiving the shaft 19 (Fig. 5).

Figure 6:
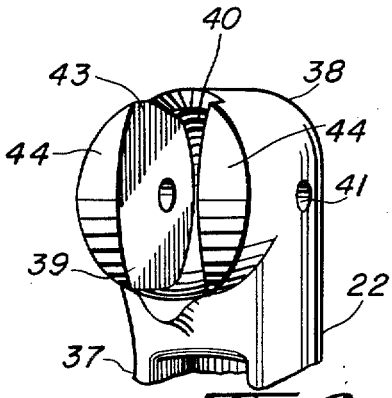
Fig. 6 is an enlarged perspective view of the inner end portion of the pivotal, rotatable lever.

The lever has a curved handle portion 37 with an enlarged head 38 at its inner end. A deep, rectangular recess or socket 39, having a curved bottom 40 complementary to the rounded outer end 35 of the spindle, is formed in the head 38 and a pair of alined openings 41 extend transversely of the recess to receive the ends of the pin 23. Limited pivotal movement of the lever about the axis of the pin and relative to the spindle is permitted by the curved end of said spindle and the rounded end 40 of the recess 39 as well as by slot 42 cut in the wall of the head opposite the handle portion 37. Manifestly, rotation may be imparted to the spindle by turning the lever. As shown in Fig. 6, a pair of inwardly-directed, opposed ears 43 are formed by the provision of the recess and the inner ends of these ears are curved or bevelled outwardly and longitudinally to provide cams or cam faces 44 for coacting with the cam ring 24.

Figure 4:
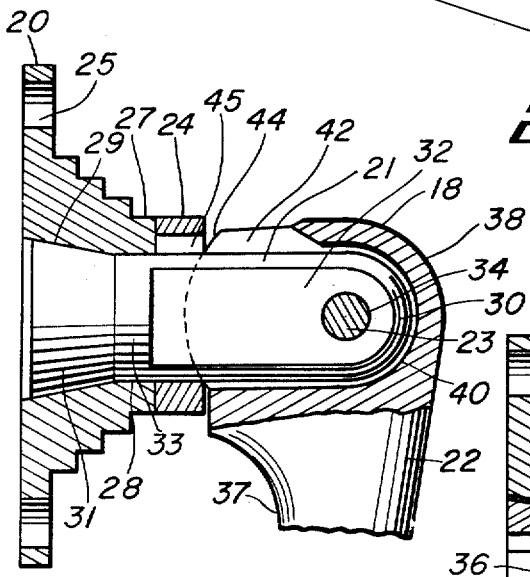
Figs. 4 and 5 are enlarged, transverse, vertical sectional views of the handle in locked and unlocked positions, respectively.

The latter is preferably circular and has an elongate opening or slot 45 through which the flattened portion 32 of the spindle extends. Thus the cam ring is rotatable with the spindle upon turning of the lever and non-rotatable relative to said spindle and lever. It is noted that the slot 45 is of a length greater than the largest width of the spindle, whereby transverse movement or sliding of the ring relative to the lever and spindle is permitted. Inwardly-bevelled cams or cam faces 46 are formed in the outer end surface of the ring parallel to the longitudinal axis of its slot for coacting with the cam faces 44 to draw the conical locking surfaces 29 and 31 into tight engagement. By longitudinally offsetting the slot toward the inner end of the lever and relative to the axis of the ring, the low points of the cam faces 46 move past the high points of the cam faces 44 upon inward swinging of the lever to increase the locking action of said faces (Fig. 4). Outward swinging of the lever causes registration of the cam faces and disengagement of the conical or wedge surfaces, which disengagement may be slight and need not be as exaggerated as shown in Fig. 5.

In operation, the lever is swung outwardly to unlock the spindle and permit rotation thereof by turning of said lever. The cam faces are moved into registration by outward swinging of the lever and then the cam ring is slid toward the outer end of said lever (Fig. 5). This permits inward movement of the spindle and disengagement, or the release of the tight engagement, of the conical surfaces whereby said spindle may be freely rotated to manipulate or adjust the louvers 12. Whenever it is desired to lock the louvers in an adjusted position, which may be closed, fully open or any position therebetween, the lever is swung inwardly. Due to the registration of the cam faces, the cam ring slides toward the inner end of the lever and into axial alinement with the spindle (Fig. 4). Continued inward swinging of the lever results in the cam faces 44 riding slightly past registration with the cam faces 46 so as to draw the spindle outwardly and tightly engage the conical surfaces of the bore and spindle. Thus, the spindle again is locked against rotation.

Figure 2:
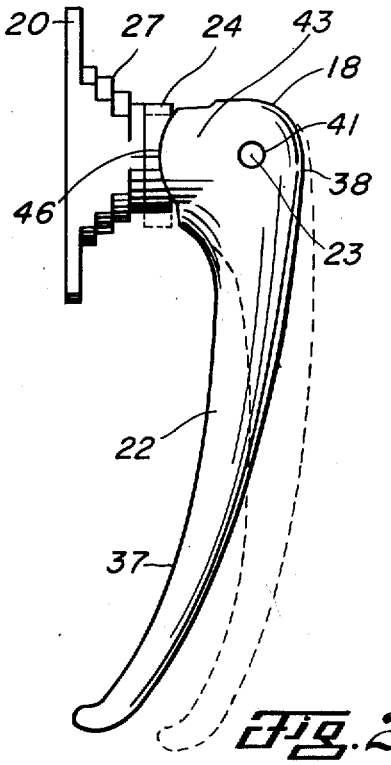
Fig. 2 is a side elevational view of the handle in a locked position, its unlocked position being shown in dotted lines.
Figure 1:
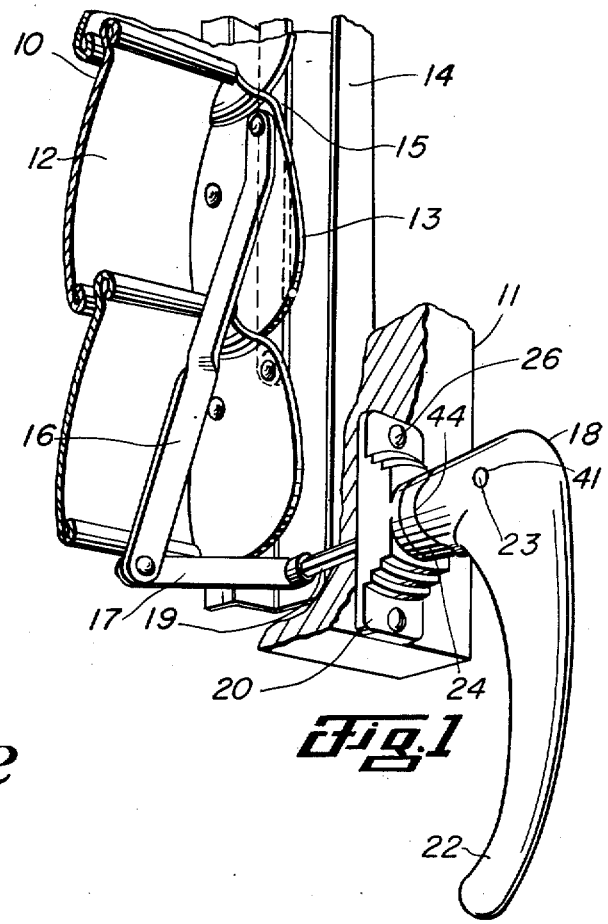
Fig. 1 is a perspective view of an operating handle, constructed in accordance with the invention, shown mounted on a jalousie.
Figure 7:
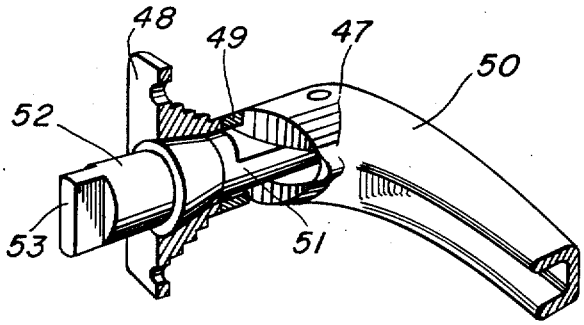
Fig. 7 is a perspective view, partly in section, of a slightly modified form of handle.

In Fig. 7 a slightly modified form of handle 47 is shown and includes an identical base or escutcheon plate 48, cam ring 49, lever 50, and a similar spindle 51. The latter is identical to the spindle 21 with the exception of the socket 36. A cylindrical shaft 52, having a flattened outer end portion 53, is made integral with or is otherwise permanently secured to the spindle 51 for connection with the link 17. Due to the similarity of construction and operation of the modified handle, a detailed description thereof is unnecessary.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. An operating handle including, a base, an element rotatably confined in the base, a lever pivotally connected to the element, said base and element having coacting tapered surfaces adapted to be engaged for locking said element against rotation, and a cam member carried by and rotatable with said element and adapted to coact with the lever for urging the coacting tapered surfaces into engagement upon pivotal movement of said lever relative to said element, the cam member being movable transversely of said element upon pivotal movement of said lever to facilitate locking and unlocking of said element.

2. An operating handle including, a base, an element rotatably confined in the base, a lever pivotally connected to the element, said base and element having coacting wedge surfaces adapted to be moved into tight engagement for locking said element against rotation, and a cam ring confined upon said element between said base and lever and rotatable with said element and movable transversely thereof for urging the wedge surfaces into engagement upon relative pivotal movement of said lever irrespective of its rotative position.

3. An operating handle including, an escutcheon plate having a bore, a portion of the bore being conical, a spindle rotatably mounted in said bore and having a complementary conical portion, a lever pivotally connected to the spindle, and a cam ring confined upon said spindle between the plate and lever so as to be rotatable with said spindle, the cam ring being engaged by said lever and being movable transversely of said spindle upon pivotal movement of said lever for urging the conical surface of said spindle into tight engagement with the conical portion of said bore for locking said spindle against rotation.

4. An operating handle including, an escutcheon plate having a bore, a portion of the bore being conical, a spindle rotatably mounted in said bore and having a complementary conical portion adapted to be tightly engaged with the conical bore portion for locking the spindle against rotation, a lever pivotally connected to said spindle, and a cam ring confined between the plate and lever upon said spindle so as to be rotatable therewith, the lever and cam ring having curved faces for coacting with each other, said ring being slidable transversely of said spindle upon pivotal movement of said lever so as to move the curved faces into and out of registration and cause longitudinal movement of said spindle to lock and unlock the same.

5. An operating handle including, an escutcheon plate having a bore, a portion of the bore being conical, a spindle rotatably mounted in said bore and having a complementary conical portion adapted to be tightly engaged with the conical bore portion for locking the spindle against rotation, a lever pivotally connected to said spindle, and a cam ring confined between the plate and lever upon said spindle so as to be rotatable therewith, the lever and cam ring having curved faces for coacting with each other upon pivotal movement of said lever so as to cause longitudinal movement of said spindle to lock and unlock the same.

6. An operating handle including, a base, an element rotatably confined in the base, a lever pivotally connected to the element, said base and element having coacting tapered surfaces adapted to be engaged for locking said element against rotation, and a cam member carried by and rotatable with said element, the cam member and lever having cam faces coacting with each other to move said element longitudinally for urging the coacting tapered surfaces into engagement upon pivotal movement of said lever relative to said element, said cam member being movable transversely of said element upon pivotal movement of said lever so as to move the cam faces into and out of registration.

*7. An operating handle including, a base, a longitudinally movable element rotatably confined in the base, a lever pivotally connected to the element, said base and element having coacting locking surfaces adapted to be engaged for locking said element against rotation, and a cam member carried by and rotatable with said element and adapted to coact with the lever for moving said element longitudinally and urging the coacting locking surfaces into engagement upon pivotal movement of said lever relative to said element, the cam member being movable transversely of said element upon pivotal movement of said lever to facilitate locking and unlocking of said element.*

*8. An operating handle including, an escutcheon plate having a bore, a spindle rotatably mounted in the bore, the spindle and bore having coacting locking surfaces adapted to be engaged for locking said spindle against rotation, a lever pivotally connected to said spindle, and a cam ring confined upon said spindle between the plate and lever so as to be rotatable with said spindle, the cam ring being engaged by said lever and being movable transversely of said spindle upon pivotal movement of said lever for urging the locking surface of said spindle into tight engagement with the locking surface of said bore for locking said spindle against rotation.*

References Cited in the file of this patent or the original patent

UNITED STATES PATENTS

| | | |
|---|---|---|
| 854,688 | Brown | May 21, 1907 |
| 1,387,432 | Gebbard | Aug. 9, 1921 |
| 1,484,875 | Clas | Feb. 26, 1924 |
| 1,487,411 | Wasson | Mar. 18, 1924 |
| 1,685,310 | Burrell et al. | Sept. 25, 1928 |
| 1,758,727 | Wilden | May 13, 1950 |